May 13, 1930.  C. S. ACTON  1,757,989
COOKING RECEPTACLE
Filed March 14, 1928   2 Sheets-Sheet 1
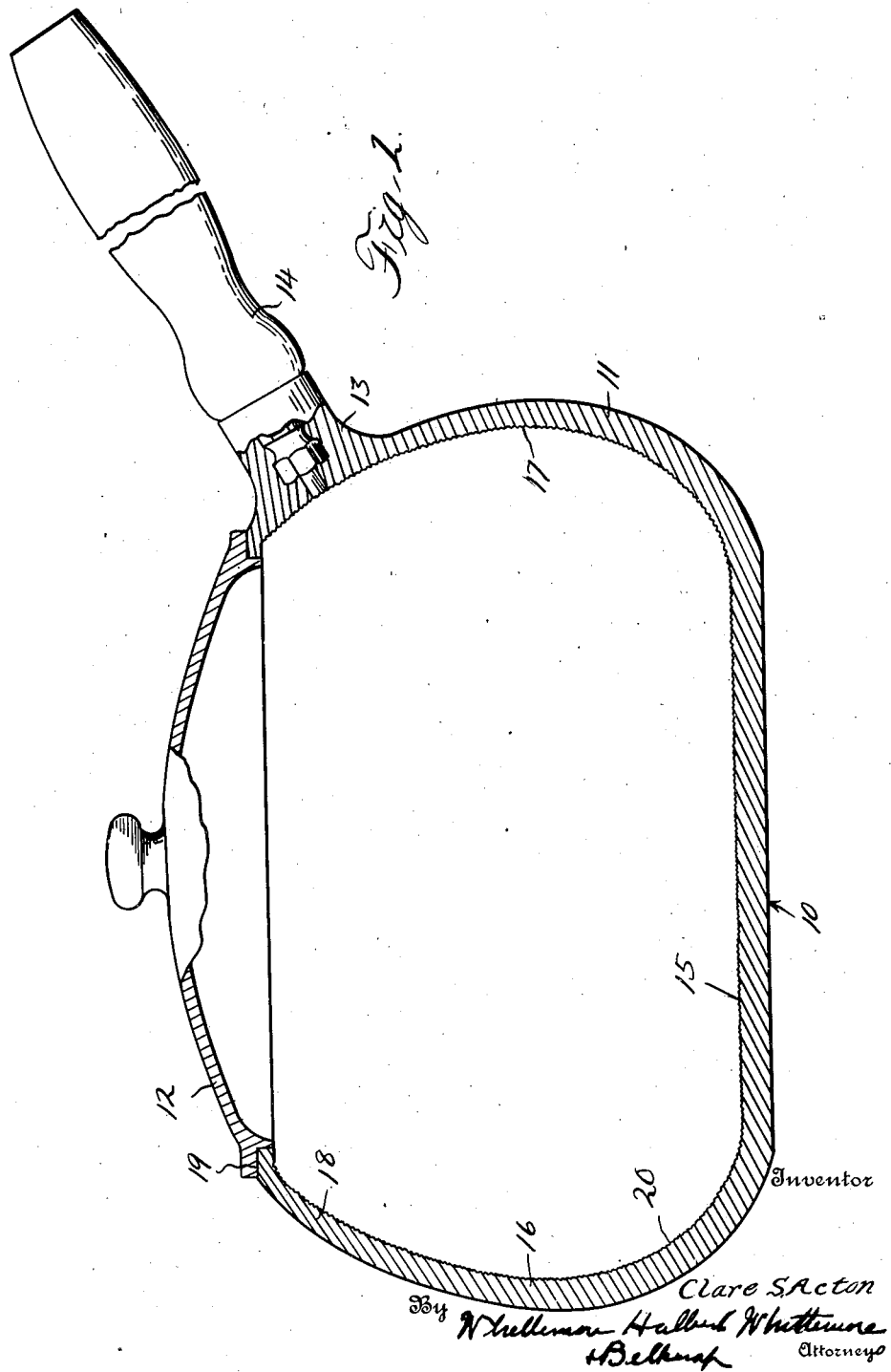

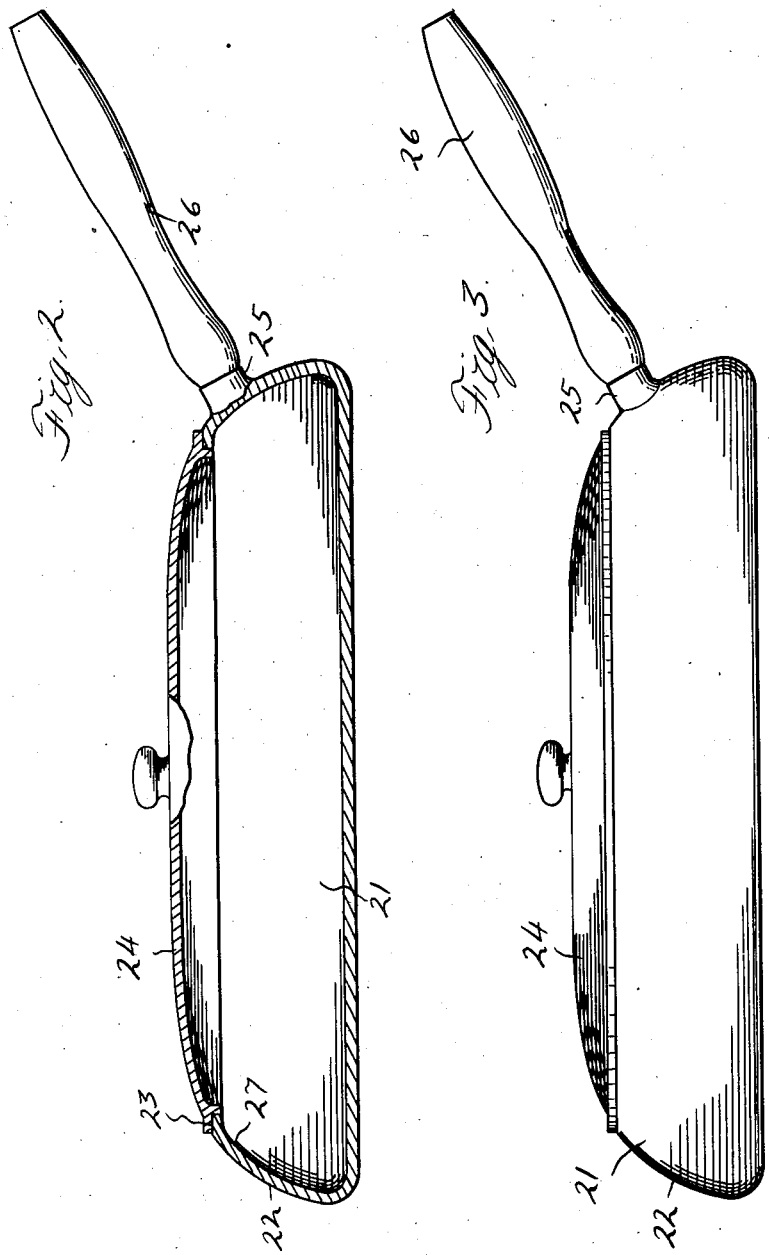

Patented May 13, 1930

1,757,989

UNITED STATES PATENT OFFICE

CLARE S. ACTON, OF DETROIT, MICHIGAN, ASSIGNOR TO WOLVERINE TUBE COMPANY, OF DETROIT, MICHIGAN, A CORPORATION OF MICHIGAN

COOKING RECEPTACLE

Application filed March 14, 1928. Serial No. 261,602.

This invention relates generally to receptacles and more particularly to cooking utensils and has as one of its objects to provide a receptacle of the above character having relatively thick walls of high thermal conductivity.

Many of the advantages and much of the commercial value and acceptability of the invention is attributed to the particular shape of the receptacle, these advantages being obtained particularly because the side walls of the receptacle converge from substantially the median line of the container to the top thereof. This enables the heat to radiate inwardly from the side walls in a direction toward the bottom of the receptacle and thereby more uniformly heat the contents of the latter.

A further advantageous feature derived from an arrangement of the foregoing character is that a substantially uniform temperature is maintained throughout all portions of the receptacle and accordingly the substance contained within the latter may be efficiently heated without the necessity of agitating the same.

The foregoing advantages as well as other objects and structural details of the invention will be made more apparent as this description proceeds, especially when considered in connection with the accompanying drawing wherein:

Figure 1 is a sectional elevation of a receptacle constructed in accordance with my invention, Figure 2 is a side elevational view of a modified form of construction, Figure 3 is a cross sectional view through the construction illustrated in Figure 2.

Referring now to the drawing, it will be noted that I have illustrated a receptacle 10 having a body portion 11 preferably cast in one piece and apertured at the top thereof to receive a suitable lid 12. Projecting from one side wall of the receptacle is a socket portion 13 for receiving a suitable handle 14.

The body portion 11 of the receptacle may be formed of any suitable material having the desired physical properties and the bottom and side walls 15 and 16 respectively thereof, together with the lid 12 are relatively thick in cross sectional area and are of high thermal conductivity so that when heat is applied to any one of the walls, the same will be rapidly conducted to all portions of the other walls. As shown in the drawing, the side walls 16 of the receptacle curve upwardly and outwardly from the bottom substantially to the median line of the container designated approximately by the reference character 17. The walls 16 then curve or bow inwardly toward the vertical axis of the receptacle as indicated generally at 18 and terminate in a flared seat portion 19 for the lid 12. As heretofore pointed out, the arrangement is such that when heat is applied to any one of the walls of the receptacle, preferably the bottom wall, this heat will be conducted rapidly to the side walls 16 and lid 12, and owing to the fact that the upper portion of the side walls 16 bow inwardly, the heat will be caused to flow from the bowed portions of the side walls in a direction perpendicular to these walls or toward the bottom of the receptacle with the result that the contents of the latter will be more efficiently heated from all sides of the receptacle. Moreover by forming the walls of the container of relatively thick material of high thermal conductivity, the temperature of the upper portions of the said walls 16 is substantially the same as the temperature of the bottom wall 15 of the receptacle, the only difference in temperature between the two said walls being the amount of heat lost by radiation at the sides of the container. To reduce the amount of heat lost by radiation the exterior surfaces of the walls 16 and lid 12 are highly finished or polished, so as to close, to a certain extent, the pores of the material. The interior surfaces of the wall 16, on the other hand, are preferably rough as indicated at 20 to increase radiation inward.

From the foregoing arrangement, it will be apparent that the relatively thick walls of the receptacle will tend to distribute and hold the heat within the latter rather than conduct the heat out of the container into the atmosphere by radiation. In other words, with the present type of container, the heat lost by radiation will be furnished by the walls themselves and accordingly the heat radiating from the walls of the receptacle into the surrounding atmosphere will not materially affect the temperature within the container. Thus it will be seen that the temperature within all portions of the receptacle is easily maintained and also the contents of the container will be more uniformly heated irrespective of whether the same is a good or poor conductor of heat.

In order to provide an efficient construction and to reduce the cost of manufacture, as well as the weight of the device, the walls preferably taper as they approach the top of the container substantially as illustrated in the drawing.

Referring now to the modified form of the invention illustrated in Figures 2 and 3, it is to be noted that there is shown a cooking utensil commonly known to the trade as a frying pan 21 having arcuate side walls 22 terminating in a substantially flat seat portion 23 for receiving the lid 24. Projecting outwardly from the side walls 22 of the receptacle is a suitable socket portion 25 in which the handle 26 may be secured in any suitable manner. As shown in the foregoing figures, the side walls 22 of the receptacle preferably terminate at the upper end thereof in inwardly extending portions 27, the arrangement being that the contents of the utensil will be prevented from escaping out of the same.

Thus from the foregoing it will be readily apparent that an arrangement of the foregoing character renders possible the production of a commercially satisfactory article and one that may be cheaply and durably manufactured.

What I claim as my invention is:

1. As a new article of manufacture, a cooking receptacle having a bottom wall and side walls projecting upwardly from said bottom wall and terminating in inwardly curved portions, said walls being highly finished on their outer surfaces to substantially close the pores thereof and roughened on their inner surfaces and being relatively thick and of high thermal conductivity so that when heat is applied to the bottom wall the same will be rapidly conducted to the said inwardly curved portions and radiated inwardly from the roughened surfaces thereof toward the said bottom wall.

2. As a new article of manufacture, a cooking receptacle having a bottom wall and side walls of high thermal conductivity, said side walls having highly finished outer surfaces to prevent the heat conducted by the walls from radiating outwardly and having relatively rough inner surfaces for increasing radiation inwardly toward the contents of the receptacle.

In testimony whereof I affix my signature.
CLARE S. ACTON.